United States Patent [19]
Mowry

[11] Patent Number: 5,140,414
[45] Date of Patent: Aug. 18, 1992

[54] VIDEO SYSTEM FOR PRODUCING VIDEO IMAGES SIMULATING IMAGES DERIVED FROM MOTION PICTURE FILM

[76] Inventor: Craig P. Mowry, 180 Central Park South #33, New York, N.Y. 10019

[21] Appl. No.: 595,082

[22] Filed: Oct. 11, 1990

[51] Int. Cl.⁵ .............................................. H04N 1/46
[52] U.S. Cl. ....................................... 358/81; 358/54
[58] Field of Search ..................... 358/22, 81, 54, 76, 358/78, 216

[56] References Cited

U.S. PATENT DOCUMENTS

| | | | |
|---|---|---|---|
| 4,606,625 | 8/1986 | Geshwind | 358/81 |
| 4,710,806 | 12/1987 | Iwai et al. | 358/81 |
| 4,727,425 | 2/1988 | Mayne et al. | 358/78 |
| 4,755,870 | 7/1988 | Markle et al. | 358/81 |

Primary Examiner—James J. Groody
Assistant Examiner—Kim Y. Vu
Attorney, Agent, or Firm—Ostrolenk, Faber, Gerb & Soffen

[57] ABSTRACT

Digital signals are generated and stored for each pixel of a frame of high definition video originated material. A computer reads the digital signals and converts them to binary image data by employing a selected look-up-table program to reassign color and black component values for each pixel. The programs applied in the component value reassignments are compiled from, and based on, comparative digital video component results of telecined film stocks' responses to selected color and grey scale gradients as charted against a selected video unit's response to the same charts under a selected number of identical lighting circumstances. The revised digital data is assembled and converted to an analog signal for a secondary modification wherein: A projector unit projects the high definition video frame through a macro lens onto a strip of exposed and processed motion picture film of an optional grey scale gradient and thus grain pattern density. An automatically variable filter over the projector lens compensates to maintain the same brightness result from the opposite side of the film surface. A precisely aligned, compatible high definition camera unit provides a synching signal to the projector and automatically frames and focuses on the projected image from the reverse side of the celluloid surface, scanning the projected scan lines, to output the grain-embodying image for recording and displaying on a high definition format or external conversation to NTSC for broadcast purposes.

38 Claims, 4 Drawing Sheets

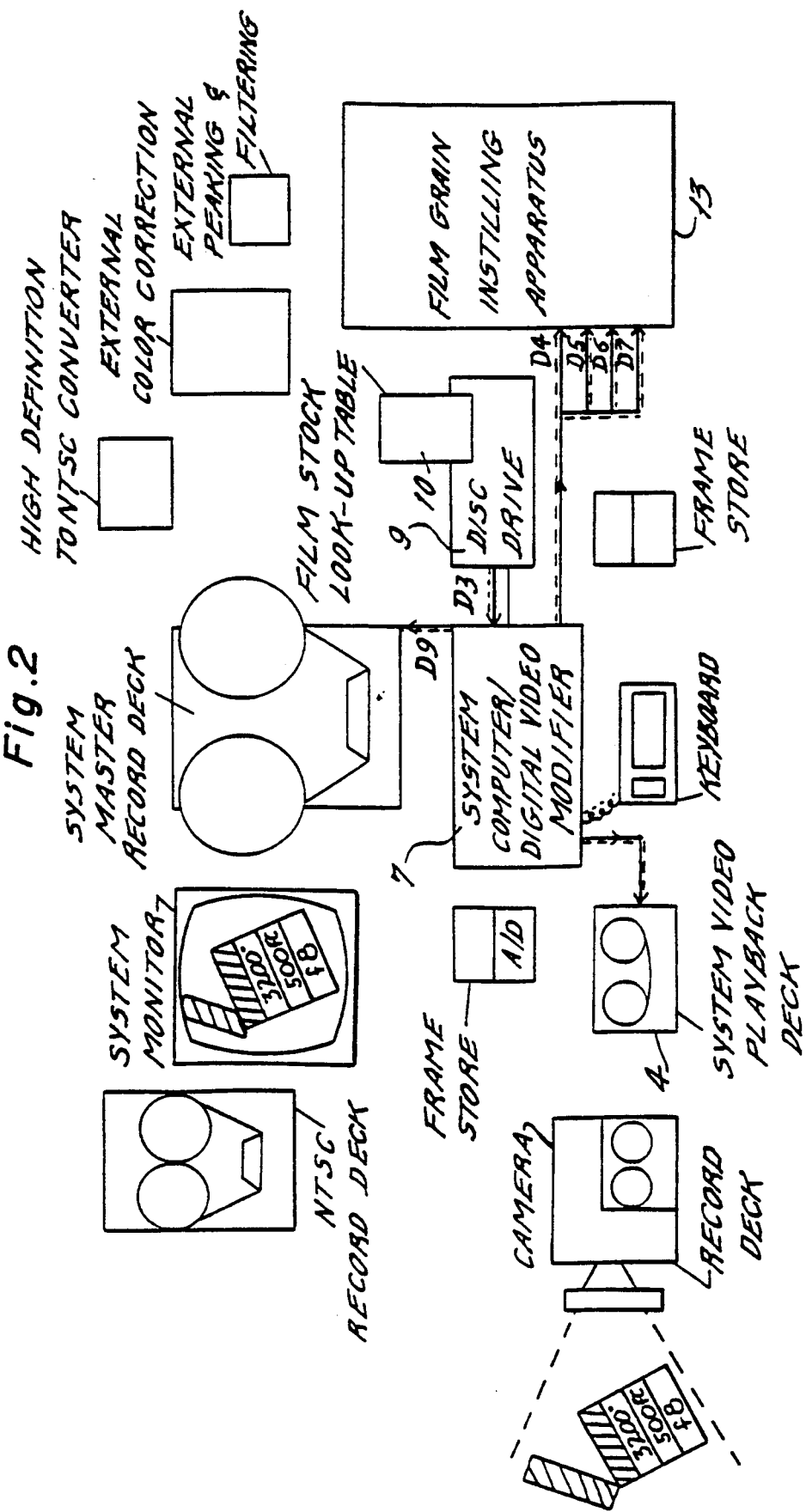

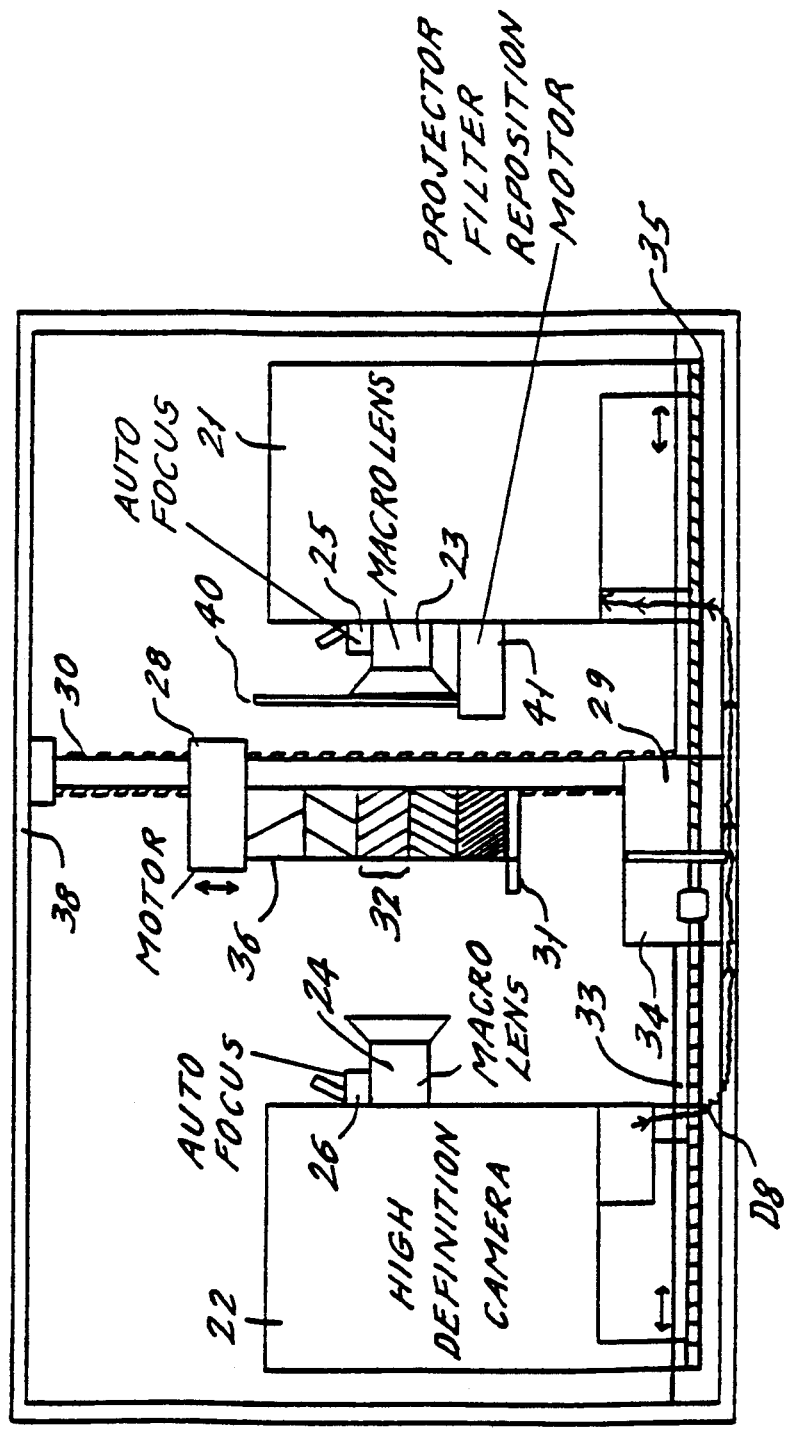

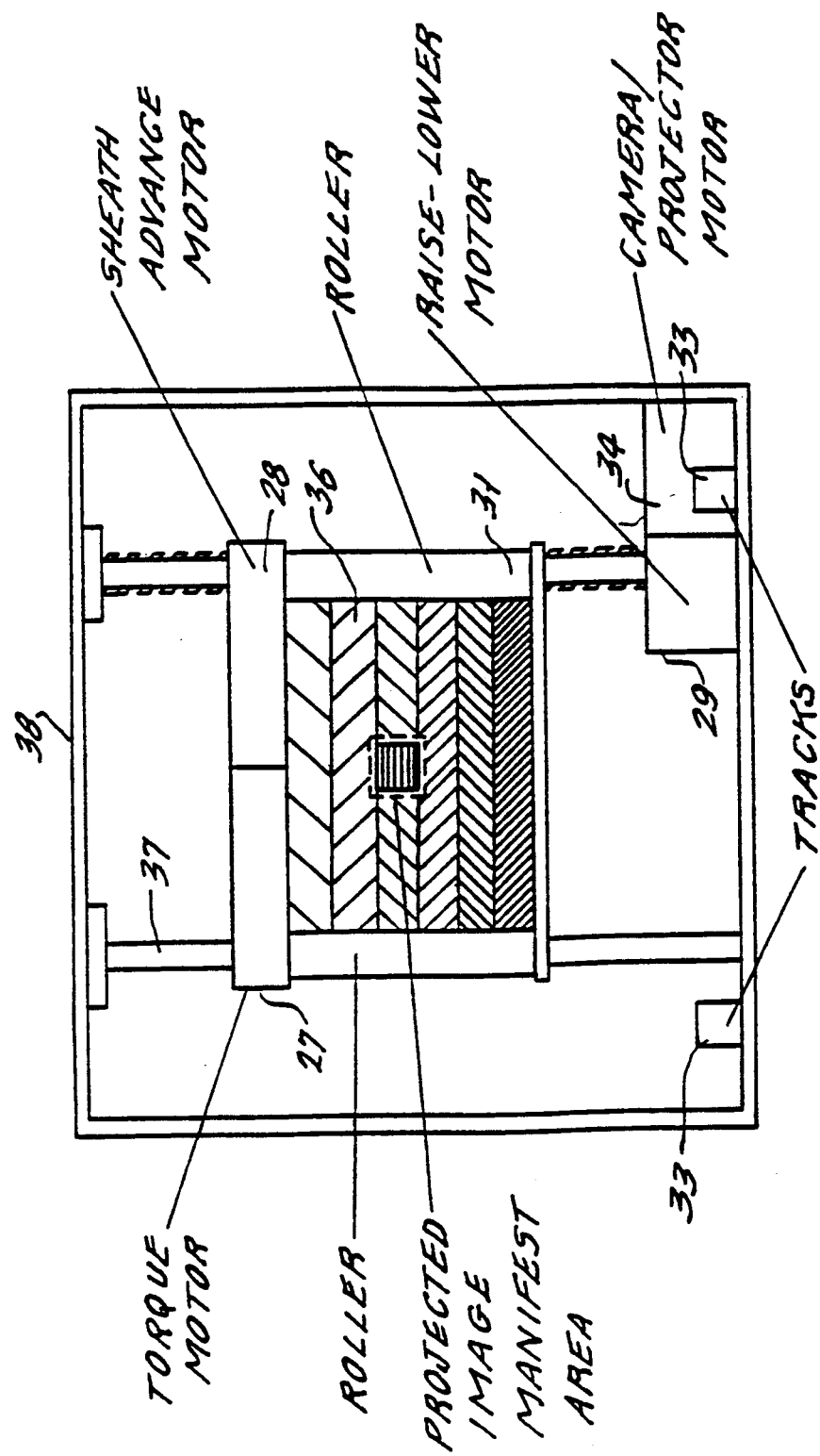

VIDEO SYSTEM FOR PRODUCING VIDEO IMAGES SIMULATING IMAGES DERIVED FROM MOTION PICTURE FILM

OBJECT OF THE INVENTION

The system of the present invention seeks to arrive at an aesthetically acceptable simulation of the appearance images originated on different motion picture film stocks embody after telecine "flying spot scanner" transfer to video, from taped high definition video originated images. And, to provide new options in processing video originated material, not limited to approximating the results images originated on a film stock would have manifested on video of a given videographic subject.

BACKGROUND OF THE INVENTION

This invention relates to the simulation of video images originated on motion picture film stocks, from high definition video originated material stored on tape.

Film has been the preferred recording medium on which to originate many productions broadcast on television for years because of the sophisticated visual impression provided by the character of film stocks' color response and the general audience familiarity with the appearance resulting from filmed material presented on television; the resulting "look", a product of the photo-chemical process preceding the production of television signals representative of the image stored in the photo-chemical process, differs in several ways from video originated material of an identical photographic subject. Two key ways in which they differ are the focus of this invention: The color and grey scale component value response in each pixel of the resulting image on a television monitor; and the subtle visual impression made by the textured appearance of film grain, which is inherent to images stored within motion picture film emulsion.

Though color negative film has the ability to reproduce abundantly more color and grey scale gradients than video originated images, when video images are created from filmed images by means of a standard telecine "flying spot scanner" transfer, an illusion of the entire range of film's color response is maintained. This phenomenon, occurring within the scope of the video medium, provides that constants exist that can define the variation in pixel response between film and video originated images shot under identical lighting conditions, when viewed on video monitors: It is the combination of filmed information as it can be reproduced on a monitor that provides the overall maintenance of the "film look", and each separate color component combination of each pixel of film originated image is in fact available and employed by video originated images, though in response to a different photographic stimulus in almost every case.

The video data resulting from a telecine transfer defines filmed images in video terms, so the medium in question is in fact video, and the parameters and actual subtleness of projected filmed images are not the issue. Rather, the video data assigned to a resulting pixel representing a zone of film emulsion is an averaging process provided by video standards and color and grey scale gradients recognized as those registered and visible on standard television receivers.

Digital video technology has provided that digital data defines video images and encodes the color and grey component values for each pixel in addressable sequences, able to be "read" and "rewritten" into a store. Therefore, given uniform and predominantly shadow-free lighting and even color temperature during original videotaping, and careful slating of this data for each shot in foot candles and degrees kelvin respectively, digital data logged from pixel response of color data originally stored in film stock emulsion, under the same light intensity and color temperature conditions, can be referenced according to principal videographic variables and inserted in place of the original video color data. This would create an aesthetic comprise that permits approximation of potentially any film stock's anticipated response to the same stimulus represented in video form.

Existing technology for the printing industry and digital video provide for scan-sequential and specifically addressed pixel component modifications according to look-up-table data, as the system of the present invention employs, (i.e. U.S. Pat. Nos. 4,727,425; 4,710,806.)

New high definition television systems and video projection systems capable of manifesting a high definition compatible number of scanning lines provide the means for executing a process whereby actual film grain within celluloid emulsion can be married with a projected image, and videographed with a loss in image clarity low enough to produce a final result which provides a film "look" to images at an aesthetically acceptable sacrifice to the original high definition integrity of the video images. Present systems strive to simulate film grain appearances digitally, with a result that is visibly different from actual film grain appearances on monitors, following a telecine "transfer." By incorporating the general videography-of-film operating basis of telecine devices, high definition projection and camera units mounted on tracks, with macro lensing, "genlock" synched together, matching scan lines to the highest degree possible can capture a complete video frame as it is projected on a grey emulsion surface of optional size. This recreation of a video signal of a high number of scanning lines from a high definition projection would have a resulting actual clarity substantially less than that of the original video material, but with the aesthetic look of film originated images. Present systems for providing an NTSC signal from a high definition signal may be employed at this stage, or the signal may be maintained as as higher definition signal for recording, monitoring or broadcasting.

So, for many television applications where film is shot for telecine transfer to video, there are benefits to be gained by employing the system of the present invention. At the production level: a television camera is employed instead of a film camera providing silence; immediate screening of the actual material shot; immediate sound synching; lesser risk of reshoots from screening original material for problems immediately; and no expense of negative film. In post production: processing of film, transfer to video and sound synching are not needed; having shot video, dailies need not be awaited; all shot selections destined for final modification by the "FILMITATOR" system are made in preliminary "off-line" edit sessions, minimizing the actual amount of material submitted for modification and thus time charges as opposed to a film shoot where typically all material must be transferred to tape, at substantial expense, for initial screening; and during modification by this system, a variety of film stock component response and film grain options may be previewed and imparted to the original video material, providing a unique range of new post-production aesthetic effects to video originated material.

SUMMARY OF THE INVENTION

The system according to the present invention provides means for digitally modifying high definition video originated images shot under even, controlled lighting conditions, according to look-up table programs based on film-originated digital color and black component binary response logs. And, secondary means for imparting a variety of possible film-grain "textured" appearances to the image resulting from the primary modification with an apparatus which videographs a videoprojection of the color modified, high definition video signal from off the emulsion layer of variably dark strips of motion picture film.

Standard video response to each gradient of red, green, blue and black distinguishable by broadcast television is derived from analyses of digital response data to color chart gradients, by a predictably responsive high definition video camera model, designated as a component of this system. The film originated digital "responses" are derived from cinematography of the same color charts under the same lighting conditions, with the conversion to digital video provided by a precisely adjusted telecine, "flying spot scanner" apparatus; binary data pertaining to single pixel component values are then logged accordingly. These digital results; the range of original video color data each digital "response" commands; and the number of charts assembled for a given film stock program, (designated and compiled according to combinations of original videography lighting conditions), define the amount of data held within each "look up chart" program and thus the color and grey-scale gradient reproduction detail available in a given film stock simulation program.

In summary, the present invention provides a video signal modification system for converting video-originated images into final video images simulating images originated from motion picture film. To this end, conversion data located in look-up tables are used for reassigning color and black component values to the picture pixels in the video-originated images with the help of computing means to thereby produce intermediate video images. Grain pattern instilling means physically instill selected film grain patterns of optional density and size into the intermediate video images to thereby produce final video images which appear as though they were derived from motion picture film stock.

BRIEF DESCRIPTION OF THE DRAWINGS

In order that the invention may be better understood an example of apparatus embodying the invention will now be described with reference to the accompanying drawings, in which:

FIG. 2 diagrams the flow of system control data, including: component advance, timing, system options, video synching and insert editing signals; and FIG. 3 shows in detail, the variable density film grain-instilling apparatus from the left side; and FIG. 4 shows in detail, the celluloid containment assembly portion of the film grain-instilling apparatus, from the viewpoint of the camera unit of the film grain-instilling apparatus.

DRAWINGS REFERENCE NUMBERS

Figure 1:
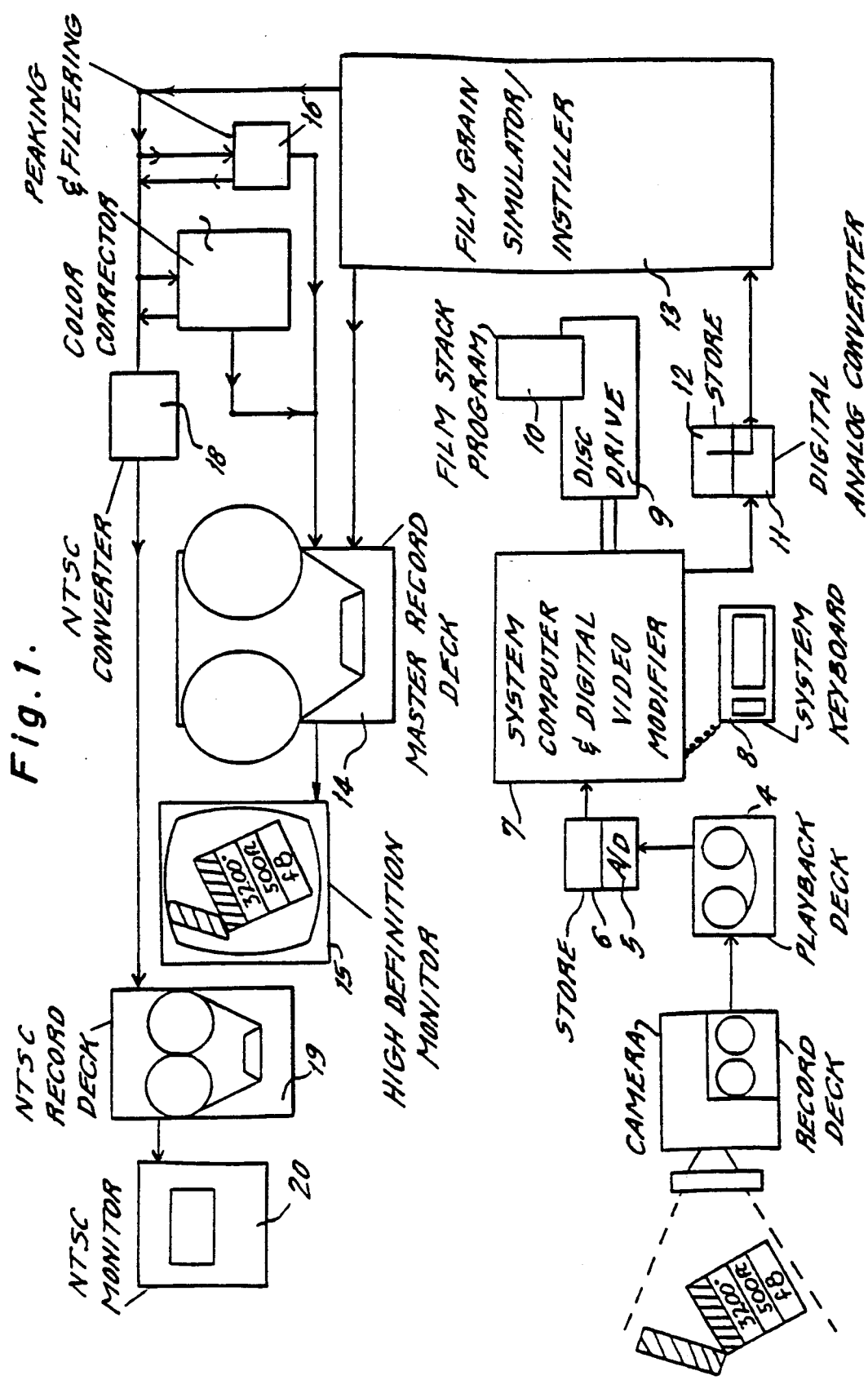
FIG. 1 is a block diagram of the "Filmitator" system and the path of analog and digital video signals therein.

1—High definition camera; principal videography
2—High definition record VTR
3—Slate with system relevant data for each scene
4—High definition playback VTR
5—Analog-Digital converter
6—Frame store
7—System computer/pixel data digital modifier
8—System keyboard
9—Disc drive
10—Film stock component simulation program
11—Frame store
12—Digital-Analog converter
13—Film grain simulator/instiller apparatus
14—High definition master record VTR
15—High definition monitor
16—Optional, external signal peaking/filtering systems
17—Optional, external manual color correction device
18—High definition-NTSC converter
19—NTSC broadcast format record deck
20—NTSC monitor
21—High definition video projector
22—High definition camera
23—Variable macro lens for projector
24—Variable macro lens for camera
25—Auto focus puller from 35 mm to 16 mm image width
26—Camera auto focus puller, 35 mm to 16 mm image width
27—Torque motor
28—Intermittent advance motor
29—Roller/celluloid sheath assembly raise-lower motor
30—Assembly support/reposition screw
31—Assembly celluloid containment rollers
32—Projected image manifest zone
33—Tracks
34—Projector and Camera dolly in-out motor
35—Projector/Camera reposition screw
36—Variable density celluloid sheath/length
37—Fixed assembly support pillar
38—Assembly frame
39—Camera to projector synch generator
40—Variable density projector filter
41—Projector filter reposition motor

SYSTEM FUNCTION SIGNALS

D1—Playback deck, single frame advance signal
D2—Keyboard to system computer data
D3—Look-up-table data, to computer internal memory
D4—Camera/Projector 35 mm—16 mm reposition signal
D5—Camera/Projector 35 mm—16 mm refocus signal
D6—Celluloid assembly raise/lower signal and projector filter raise/lower signal
D7—Ceiluloid containment rollers intermittent advance signal
D8—Gen. lock signal from camera synch generator
D9—Master record, single frame insert record signal

DETAILED DESCRIPTION OF THE PREFERRED EMBODIMENT

In FIG. 1, the production stage of this system includes: a high definition video signal being provided by a selected camera model 1, capable of outputting a signal derived from an oscillatory scan or preferably from a unit that performs an initial scan of at least double the 525 lines per two fields of NTSC television, which is recorded by a selected, compatible VTR 2, capable of taping the high definition signal. Lighting conditions at principal videography are conformed to one of the available lighting variable combinations, explained in detail later. These variables, namely the selected camera f-stop setting for a scene, the average brightness of the scene in foot candles, and the average color temperature of the scene in degrees Kelvin, are slated for the camera before each take, 3. For best result in the primary color component modification process of this system, the color temperature and brightness of each zone within the area being videographed must be as uniform as possible, and illuminated by diffused, low-key lighting that discourages shadowing.

In the post-production stage of this system, FIG. 1. diagrams the path of the video signal, while FIG. 2 diagrams the flow of system data which controls timing, positioning, synching and advancing of system components. In response to a frame-advance signal D1, the high definition playback deck 4, advances one frame, and outputs this single frame of video data to analog-digital coverter 5. The binary data is held in frame store 6, and read from this store by system computer 7, at the rate dictated by the time required to modify data for each red, green, blue and black component for each pixel, scan-sequentially. To perform this digital modification, a single, selected look-up-table 10, is read by disc drive 9 and relayed as data D3 to the internal memory of the system computer 7, in accordance with a table select command entered through the system computer keyboard.

The look-up-table selected is of the one-dimensional kind and is an element of a larger program which is representative of component responses of video material originated on a single film stock, in a variety of lighting circumstances. The digital representation of the film component responses are derived from telecine, flying-spot-scanner transfer to videotape: By filming color charts and grey scale charts containing at least those gradients deemed registrable by broadcast NTSC television and charting the binary component-data results against video originated images, shot with the selected high definition camera unit of this system of the same charts under the identical lighting conditions, a basis for translation is formed. A simple film stock program might contain tables for five f-stop settings, ten light intensity possibilities and five color temperature options; a total of 250 look-up-tables, contained on discs grouped according to f-stop setting, or depending on the volume of data within each table, an f-stop and a color temperature, with all lighting intensity options for the two fixed variables resulting in ten tables per disc, etc.

Within a look-up-table, the component value translations may be as specific as to address the actual subtlety of film and the large number of color and grey scale gradients color negative film can register. But, because the process is designed for eventual display on a video monitor, the degree of specificity needed is immediately diminished by the inherent limitations of video. If data groupings of video data derived from videography of the charts are to be defined by those component gradients registrable by NTSC broadcast television, the range of original video component data in a single grouping is broadened further, and number of corresponding look-up-table "answers" are reduced in comparison to the huge number of groupings that might be logged. So, the degree of detail available within a single look-up-table, or the table's capacity, is determined by the intended display system and a determined level of modification deemed acceptable as a compromise between the size of the tables to be assembled and the aesthetic result of the component modifications; it is an option determined by the intricacy of a given program assembled for this system as implemented by a system computer internal memory capable of storing at least a single table of the greatest detail that might be needed for the most sensitive monitoring systems applicable. Each component's digital "word" is thus read, for each pixel, and replaced by the corresponding answer "word" which is referenced in the table and determined to govern the range of original videography data in which the "word" submitted falls. The binary response, indicating the approximate anticipated component value response had the program film stock been the original image storage medium, is output to a receiving frame-store 11, in which the revised frame of digital video data is assembled. This data is then converted to analog by digital-analog converter 12, and is relayed at normal scanning rate, for display, to apparatus 13 for a secondary modification.

Apparatus 13, is designed to physically instill a variety of actual film-emusion grain apperances to images manifested from the primary digital modification process of this system. As detailed in FIG. 3, diagraming the film-grain instilling apparatus, high definition projection unit 21, is the component which receives the modified high definition analog video signal. This projection unit is preferably of the type capable of reproducing the level of definition and number of scan lines provided by the video signal. Facing the projection unit lens is a high definition camera unit 22, to which the projector is gen-locked, by means of a synching signal D8, output to the projector by the camera unit internal synch generator 39. The camera and projector are mounted on tracking 33, which by means of motor 34, allows them to simultaneously move toward or away from each other in response to a signal D4 output by the system computer, which commands the units to approach eachother a short distance if 16 mm film grain is to be simulated, or to move away to simulate a 35 mm grain size. Variable focus, macro lenses 23 and 24, on both the projector unit and the camera unit also respond accordingly to system computer generated signal D5 by focusing for an image manifest area of either 16 mm or 35 mm in width automatically, as provided by focus-pulling motors 25 and 26.

Between the camera and projector lenses is a length of celluloid 36, preferably comprised of reversal motion picture film stock, which is contained between two rollers 31, and kept taught between the containment rollers by torque motor 27. Being of at least a meter in length and at least 175 mm in width, (meaning top to bottom in FIG. 4), the portion of the celluoid length not visible between the containment rollers, is "spooled" on the rollers. Comprised from top to bottom of 35 mm strips of different grain density and thus darkness, the celluloid length is a continuous piece containing grey scale gradient strips created by actually exposing and processing the celluloid-film sheath for this use, accordingly.

Supported by roller assembly support 37 and support screw 30, which are mounted in celluloid roller assembly support frame 38, the rollers and celluloid length can raise or lower, placing a different darkness grey strip section in line with the projector beam's image manifest area 32, as assembly raise-lower motor 29 turns support screw 30, in response to data received from the system computer as signal D6. Also in accordance with the D6 signal, a variable density filter 40, mounted over the lens of the projector unit is repositioned to a density section, by motor 41, to compensate for the darkness of the celluloid density strip selected on which to manifest the projection, so that from the camera side of the celluloid a constant level of brightness is maintained for a given image projected, regardless of the grey scale gradient of the celluloid strip selected as the image manifest surface.

Torque motor 27, has an advancing motor 28 within its housing which moves the rollers, and thus celluloid length, in either direction on receipt of celluloid advance signal D7; this torque/advance motor combination has means to intermittently advance the rollers not less than 20 mm, up to 30 times each second. Also, a switch triggered as the celluloid nears the end of its length on either roller, reverses the direction of the advancement, without slowing or interrupting the intermittent motion.

The camera unit's scan of the emulsion layer of the celluloid image-manifest area 32, on which both the camera and the projection are focused, is of a type which reproduces the maximum number of the scan lines manifested on the celluloid surface; both units being aligned appropriately, the high definition camera should scan synchronously with the projector, maintaining the maximum degree of definition and image integrity possible in videographying the projection, without noticeably altering the projected color components. The resulting image videographed will embody the selected grain textured appearance of the celluloid emulsion as an aspect of the overall video image.

The high definition signal output by the camera unit may be subjected to external peaking and filtering controls 16, or may be converted by an external unit 18 to NTSC standards for broadcasting or standard monitor display 20, or recording 19; an external aesthetic color adjusting system 17, familiar in adjusting signals derived from telecine transfers, may also be employed in final signal adjustments. The high definition camera signal may be recorded directly by high definition master VTR 14, in response to insert frame record signal D9, or the signal may be output to the deck by optional external components 16 or 17, depending on final signal patching.

From the high definition master VTR 14, the image is relayed as a complete frame to compatible high definition monitor 15. From this balanced monitor display, all aesthetic system adjustments to a scene are made by previewing a single frame and those resulting changes different film stock programs, celluloid density strips for projection, or manual adjustments made through external color or signal modifiers would have on the original video image. In a more sophisticated system, cascade filtering circuit technology, (U.S. Pat. No. 4,885,787) may provide means to modify pixel data quickly enough to preview and view modifications of scenes in real time, so option settings need not be made according to the appearance of a single image and real-time modifications can be seen before they are insert recorded. A configuration of the system of the present invention may also provide for a system computer with an internal memory capable of recalling an entire film stock program, instead of just one look-up-table, the minimum amount of data necessary for modification of a complete video frame; this would save time during set-up for modification of each new scene having a different corresponding look-up-table within the same film stock program.

Though the present system strives to maintain a superior video definition level to NTSC standards throughout to compensate for any loss of original image integrity incurred through the film grain-instilling process of apparatus 13 (FIG. 1), a configuration of this system for the purpose of deriving an NTSC signal from NTSC video originated material is possible with a corresponding compromise to the image derived from the resulting video signal. Referring to FIG. 1, camera 1 might be replaced by a well balanced NTSC unit with its signal being recorded on a broadcast NTSC deck, 2. NTSC deck 4, would relay a frame of video to analog-digital converter 5, and this digital data would be held in store 6, which would be of a correspondingly lesser capacity than the former store which held data binary data for a high definition video frame. Computer 7 would execute a total number of pixel-component modifications per frame of approximately half that needed for the high definition configuration, and thus the time frame needed for this phase could be correspondingly reduced. The programs and look-up-tables would remain the same, as they address the modification of each pixel, and would not be changed by the fact that fewer total pixels per frame are being modified. Store 11 would need only the capacity to hold data supplied by computer 7 corresponding to the 525 line NTSC system. This frame would be converted to analog by converter 12 and the resulting signal could be output to an external scan-doubling system 36 which would provide high definition compatible projector 21 (FIG. 3), with a signal it would project as an image with an increased number of resolved lines, as compared to a signal where blanking manifests itself as a black line between two resolved lines.

The film grain instilling assembly 13 would remain the same, with the camera unit 22 (FIG. 3), being replaced by an NTSC unit, such as those use in present telecine "film-to-tape" systems. The option of filtering and peaking controls 16 and external color correction 17 would remain, and the NTSC signal could be routed directly from the camera unit 22 or from said optional modifier(s) for final record by a master record deck replaced in this configuration by an, NTSC broadcast format unit 19. Final display for system previewing and reviewing would occur on monitor 20, replaced by an NTSC unit such as higher performance NTSC units used in conjunction with telecine film-to-tape transferring systems. All other system functions and data signals would remain as in the high definition configuration.

I claim:

1. A video signal modification system for simulating video images originated on motion picture film stocks from high definition video originated images, including:
    computing means for reassigning color and black component values for each pixel, scan-sequentially, within each frame of a high definition originated image stored on tape, based on digital component modifications;
    look up table programs on which said digital component modifications are based, representing and compiled from comparative digital results of film stocks' responses to selected color chart gradients under selected lighting conditions, following a telecine transfer to digital video, as plotted against a video originated response to color and grey scale charts under same lighting combinations;

means for physically instilling selected film grain patterns of optional density and size, to the images resulting from a high definition videoprojection of frame store data derived from primary digital modification effected with said computing means;

means for videographing said videoprojection with a high definition camera unit, aligned to and with technical means to maintain a high degree of the projected image's integrity;

means for compatibly: recording; playing back; frame-storing in digital form; digitally altering; frame-storing again; reconverting to analog and videoprojecting; re-recording and displaying on a monitor, a high definition video signal; and means for governing all insert time-code editing, system function, timing, and component advance signals through a system computer from a keyboard coupled to said system computer.

2. The system as in claim 1, said computing means including a computer having means to address and replace digital color and black component data for every pixel within a high definition image stored on tape, and to recall look-up table programs to employ as the basis of digital translations effected by said computing means.

3. The system as in claim 2, wherein said look up table programs used as the basis of the primary digital modification are of the one dimensional kind, compiled and recalled according to selected data plateaus based on the chosen film stock to be simulated and three principal videography variables:

color temperature in degrees kelvin
brightness in foot candles
the selected shooting f-stop setting.

4. The system as in claim 3, wherein look up table data for ranges of original video data, and corresponding response data indicating anticipated film stock response, are derived from detailed digital logs from analyses of videography and telecined film shot of selected color chart and grey scale gradients under the said lighting and f-stop variable combinations shared by the look-up-table being assembled.

5. The system as in claim 4, wherein the number of shooting-variable based look-up-tables prepared for a given film stock program alone determine the number of said lighting and f-stop variables available for use during principal videography.

6. The system as in claim 4, wherein said look-up-tables are at least detailed enough to contain data plateaus necessary to address those color component and grey scale gradients deemed registrable by NTSC television standards, with any additional detail and specificity in digital component modification for providing additional color detail discernible by more sensitive television systems and monitors being determined by the incremental size of data groupings of original video data and thus the number of corresponding digital answers provided by a look-up-table employed.

7. The system as in claim 6, wherein digital data groupings contained in said look-up-table programs, indicating ranges of video originated data are derived from digital data resulting from videography of color and grey scale charts with a single, selected high definition camera model of the type with means to scan along at least double the 525 lines per two fields of the NTSC television system.

8. The system as in claim 7, wherein said high definition camera model and corresponding record deck for recording the original high definition signal are designated as components of this system and are the preferred models for use in all original videography for modification by this system.

9. The system as in claim 1, wherein an apparatus provides means for instilling various grain textures to the image resulting from the primary digital modification including:

means to videoproject a high definition image on a surface 16 mm, or 35 mm wide;

a transparent grey celluloid length, or celluloid sheath, on which to manifest the projected image;

an assembly to contain the length of celluloid, with means to move the sheath intermittently, and to raise and lower it relative to a projector beam;

a camera unit, with means to generate a video synching signal for the projector unit, aligned and with high definition capability to scan synchronously with scan lines manifested on the celluloid sheath by the projector, including means to focus and frame on a 16 mm or 35 mm image as projected from the opposite side of the celluloid sheath surface;

means for applying peaking and filtering controls, familiar in film to tape transferring systems, to the camera unit and signal output by the camera unit;

means for outputting the camera signal for optional modification by an external unit, such as a separate color modification device or NTSC converter, prior to recording.

10. The apparatus as in claim 9, wherein said video projector and camera units are mounted on tracks that permit the units to move toward or away from each other, and each correspondingly having electronic, variable macro-lensing providing means to reframe and focus said units simultaneously on a surface area of 16 mm or 35 mm in width when signalled, while maintaining maximum scanning line alignment between the two units.

11. The apparatus as in claim 9, wherein said camera unit is compatible with said projector unit, having means to produce a technically clean video signal, with a minimal degree of definition loss in videographing said videoprojection.

12. The apparatus as in claim 9, wherein the camera unit has means for generating a synch signal to the projector unit, which reciprocally has means to slave its projection accordingly to the video synching signal it receives.

13. The apparatus as in claim 9, wherein said camera unit has means to output a high definition signal for recording as such, or to output said signal for external conforming to NTSC television standards.

14. The apparatus as in claim 9, wherein the celluloid sheath is stretched between two containment rollers and functions as a transparent image manifest plane for said videoprojection on one side, and the image plane for videography by the camera unit on the reverse side.

15. The apparatus as in claim 9, wherein said celluloid sheath is a length of exposed and processed motion picture film, at least one meter long and 175 mm in width, containing at least five exposed strips 35 mm in width, of increasing grain density and thus darkness, representing plural grey scale gradients.

16. The apparatus as in claim 9, wherein said length of celluloid is contained on an assembly capable of raising and lowering containment rollers, and thus the celluloid image manifest plane, providing means for placing a selected grain density celluloid strip in line with the projector beam.

17. The apparatus as in claim 9, wherein a variable density light filter and governing motor is aligned between the projector lens and the celluloid sheath, providing means for automatically varying the projection's intensity as manifested on the celluloid sheath, in accordance with the darkness of a celluloid strip selected on which the image will be formed.

18. The apparatus as in claim 9, wherein the assembly includes rollers and has torque means for maintaining tension between the rollers so the celluloid sheath is completely flat in and around an image manifest zone.

19. The apparatus as in claim 9, wherein said assembly includes rollers and has means to advance the rollers intermittently, in two directions, thus advancing the length of celluloid 20 mm, up to thirty times each second in response to an advance signal received from the system computer.

20. The apparatus as in claim 9, wherein said assembly includes rollers and said intermittent advancing means has additional means for automatically reversing the rollers' advance direction, without any delay in the intermittent motion, when the length of celluloid is reached by either roller.

21. The apparatus as in claim 9, wherein the signal output from said camera unit may be subjected to external color correction devices or other modifications before recording.

22. The system as in claim 1, wherein all high definition components employ compatible technology and number of lines at scan, maintaining a high degree of the high definition image integrity through to its final recording or conversion.

23. The system as in claim 1, wherein editing functions including playback, edit controller and recorder are capable of single frame insert editing at speeds dictated by the system computer.

24. The system as in claim 1, wherein a resulting high definition signal output by this system is of a type able to be efficiently converted to NTSC requirements by an existing external conversion system.

25. The system as in claim 1, wherein all system functions, timing features, single-frame insert editing functions, advance signals and variable selections are governed by the system computer, with all system options and manual aesthetic adjustments of the digital component modification and film-grain instilling process controllable from the keyboard portion of said computer.

26. The system as in claim 1, wherein a second possible configuration of system components replaces high definition units with NTSC compatible components with the system of this configuration recording a modified NTSC signal derived from original NTSC taped material, with the video projector unit remaining the single system component with scanning line capacity of at least double that of NTSC standards.

27. The system as in claim 26, wherein an existing scandoubling system provides means to relay a signal of an increased scan line number from an NTSC signal originally derived from any NTSC camera and VTR combination, to the video projector unit for manifestation of the video image on the celluloid sheath to be videographed by an NTSC camera unit.

28. The system as in claim 1, including system configuration control means for maintaining said video originated images as a digital signal, throughout, said system configuration control means including:
   a digital video camera and videotape recorder for effecting principal videography;
   a digital video projector and camera comprising said film grain pattern instilling means;
   whereby analog-to-digital conversion prior to processing said video originated images in said look-up table means, and digital-to-analog conversion prior to effecting videoprojection of said intermediate video images, is rendered unnecessary.

29. A video signal modification system for converting video originated images into final video images simulating images originated from motion picture film, the modification system including:
   look-up table means for holding conversion data correlating color and black component values of picture pixels in said video originated images with modified component values, said conversion data being selectable for said picture pixels based on a plurality of parameters including lighting conditions;
   computing means coupled to said look-up table means for reassigning values for said color and black component values for substantively each said picture pixel within each frame of said video originated images in dependence on said modified component values selected from said look-up table means and thereby producing intermediate video images;
   grain pattern instilling means for physically instilling selected film grain patterns of optional density and size into said intermediate video images; and
   final image producing means for producing said final video images from said intermediate video images which have had said film grain patterns instilled therein.

30. The system of claim 29, wherein said grain pattern instilling means includes means for producing a high definition video projection of frame store data derived from said intermediate video images.

31. The system of claim 30, wherein said grain pattern instilling means comprises means for videographing said high definition video projection with a high definition camera unit which is synchronized to said high definition video projection to maintain a high degree of projected image integrity.

32. The system of claim 29, wherein said video originated images comprise images obtained with a high definition video image generating apparatus.

33. The system of claim 32, wherein said video originated images are sequentially scanned video images.

34. The system of claim 29, further including compatibility maintaining means for compatibly: recording; playing back; frame-storing; digitally altering; frame-storing again; reconverting to analog and video projecting; and re-recording and displaying on a monitor, a high definition video signal.

35. The system of claim 29, further including control means for controlling all insert time-code editing, system function, timing and component advancing through a system computer from a single keyboard.

36. A video signal modification system for converting video originated images into final video images simulating images originated from motion picture film, the modification system including:

look-up table means for holding conversion data correlating to color and black component values of picture pixels in said video originated images with modified component values, said conversion data being selectable for said picture pixels based on a plurality of parameters including lighting conditions;

said conversion data being compiled and recallable according to a chosen film stock to be simulated, said parameters including:
(a) color temperature;
(b) brightness; and
(c) a selected shooting f-stop setting;

computing means coupled to said look-up table means for reassigning values for said color and black component values for substantively each said picture pixel within each frame of said video originated images in dependence on said modified component values selected from said look-up table means and thereby producing intermediate video images; and means for producing said final video images from said intermediate video images.

37. The system as claimed in claim 36, wherein look-up table data for ranges of original video data, and corresponding response data indicating anticipated film stock response, are derived from detailed digital logs taken from analyses of videography and telecined film shots of selected color chart and grey scale gradients under combinations of said brightness and f-stop setting.

38. The system as in claim 37, wherein the look-up table means comprises a plurality of shooting-variable look-up tables and the number of shooting-variable look-up tables prepared for a given film stock program alone determine the number of said brightness, temperature, and f-stop settings available for use during principal videography.

* * * * *